US010819741B2

(12) United States Patent
Broadworth et al.

(10) Patent No.: US 10,819,741 B2
(45) Date of Patent: Oct. 27, 2020

(54) PREDICTIVE FRAUD PREVENTION FOR COLLABORATION CONFERENCING SYSTEMS

(71) Applicant: Level 3 Communications, LLC, Broomfield, CO (US)

(72) Inventors: Andrew J. Broadworth, Thornton, CO (US); Matthew McCarthy, Lakewood, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 242 days.

(21) Appl. No.: 15/282,743

(22) Filed: Sep. 30, 2016

(65) Prior Publication Data

US 2017/0324771 A1    Nov. 9, 2017

Related U.S. Application Data

(60) Provisional application No. 62/332,923, filed on May 6, 2016.

(51) Int. Cl.
*H04L 29/06* (2006.01)
*H04L 29/08* (2006.01)

(52) U.S. Cl.
CPC ........ *H04L 63/1466* (2013.01); *H04L 63/083* (2013.01); *H04L 63/10* (2013.01);
(Continued)

(58) Field of Classification Search
CPC . H04L 63/1466; H04L 63/10; H04L 63/1408; H04L 63/102; H04L 63/083
See application file for complete search history.

(56) References Cited

U.S. PATENT DOCUMENTS

| 9,888,016 B1* | 2/2018 | Amin | H04L 63/1483 |
| 2003/0007621 A1* | 1/2003 | Graves | H04M 3/5191 |
| | | | 379/219 |

(Continued)

OTHER PUBLICATIONS

International Search Report dated Jan. 19, 2017, Int'l Appl. No. PCT/US16/054942, Int'l Filing Date Sep. 30, 2016; 3 pgs.

(Continued)

*Primary Examiner* — Farid Homayounmehr
*Assistant Examiner* — Suman Debnath

(57) ABSTRACT

Aspects of the present disclosure involve systems and methods for detecting a potentially fraudulent access of a collaboration conferencing system on a telecommunications network and executing a corrective action in response to the detected access attempt. In some instances, the corrective action includes denying access to the collaboration system when the fraudulent access attempt occurs. In other instances, the corrective action includes providing a warning to the caller, rerouting the communication to another system within the network, or reporting and storing of the fraudulent attempt. To detect the possible fraudulent access attempt, a device may detect more than one fraudulent access attempt to the collaboration conferencing system and determine a pattern. With the pattern of attempts known, the system accesses a database to determine if a valid account is likely to be accessed by the fraudulent attempts and takes actions to prevent access to the valid account.

20 Claims, 5 Drawing Sheets

FIG. 2B

(52) U.S. Cl.
CPC ........ *H04L 63/102* (2013.01); *H04L 63/1408* (2013.01); *H04L 65/403* (2013.01); *H04L 67/306* (2013.01)

(56) References Cited

U.S. PATENT DOCUMENTS

| | | | |
|---|---|---|---|
| 2009/0172788 A1* | 7/2009 | Vedula | H04L 63/08 |
| | | | 726/5 |
| 2011/0135082 A1* | 6/2011 | Lingafelt | H04L 12/1822 |
| | | | 379/203.01 |
| 2012/0042364 A1* | 2/2012 | Hebert | G06F 21/46 |
| | | | 726/6 |
| 2012/0246103 A1* | 9/2012 | Mantripragada | H04L 63/1408 |
| | | | 706/45 |
| 2013/0243177 A1* | 9/2013 | Altberg | H04L 29/1216 |
| | | | 379/210.01 |
| 2016/0188854 A1* | 6/2016 | Kim | G06F 21/316 |
| | | | 726/19 |

OTHER PUBLICATIONS

Written Opinion of the International Searching Authority dated Jan. 19, 2017, Int'l Appl. No. PCT/US16/054942, Int'l Filing Date Sep. 30, 2016; 4 pgs.

International Preliminary Report on Patentability, dated Nov. 6, 2018, Int'l Appl. No. PCT/US16/054942, Int'l Filing Date Sep. 30, 2016; 6 pgs.

* cited by examiner

PREDICTIVE FRAUD PREVENTION FOR COLLABORATION CONFERENCING SYSTEMS

CROSS-REFERENCE TO RELATED APPLICATIONS

This application is related to and claims priority under 35 U.S.C. § 119(e) from U.S. Patent Application No. 62/332,923, filed May 6, 2016, titled "PREDICTIVE FRAUD PREVENTION FOR COLLABORATION CONFERENCING SYSTEMS," the entire content of which is incorporated herein by reference for all purposes.

TECHNICAL FIELD

Aspects of the present disclosure generally relate to systems and methods that provide for collaboration conferencing with multiple participants using devices connected to a telecommunication network, including a VoIP network, and more specifically for predicting and preventing potential fraudulent access to accounts of the collaboration conferencing.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide a conferencing feature that allows several users of the network to communicate at once, rather than a simple person-to-person communication. The number of participants to a conference communication may range from a few users to several thousand users communicating on the same telephonic and/or data call.

Typically, conferencing communications require participants to the conference to place a telephonic call to a dedicated conferencing number. Some networks also require the participants enter a conference call code into the keypad of a telephonic device. The conferencing number and code are then utilized by the telecommunications network to connect that participant to a conferencing bridge device. In still other embodiments, the conferencing bridge may request a second identification code that indicates the participant is a chairperson for the conference. In general, a conferencing bridge is a telecommunications device that hosts the participants of a conferencing communication such that the participants can attend the communication. Thus, the network typically receives the dialed number and conference code from each participant and connects the participant to the conferencing bridge. Once connected to the conference bridge, the participant may take part in the conferencing communication. A chairperson to the collaboration conference may have certain additional features for the conference, such as the ability to mute participants, hang-up on participants, or to control aspects of an associated web conference.

In general, access codes for the collaboration conferencing system are provided to the users when they subscribe to the system or feature. In some instances, however, non-subscribers may attempt to obtain or guess valid access codes to the collaboration system to access the system for fraudulent uses. In one particular approach, illegitimate users dial into the collaboration conferencing system and provide several estimated access codes to determine if any of the access codes grant access to the system. In other words, these illegitimate users attempt to guess a valid access code to utilize a subscriber's subscription to the collaboration conferencing system and fraudulently use the subscriber's valid account. Such unauthorized access to the system cause many inefficiencies within the operation of the telecommunications network and, in particular, the collaboration conferencing system hosted by the network.

It is with these and other issues in mind that various aspects of the present disclosure were developed.

SUMMARY

One implementation of the present disclosure may take the form of a telecommunications network comprising at least one conferencing bridge and at least one routing device. The routing device of the network is configured to receive a plurality of incorrect access codes from a communication device connected to the telecommunications network and conduct pattern recognition on the plurality of incorrect access codes to predict at least one predicted access code from the communication device. Further, the routing device compares the at least one predicted access code to a database of valid access codes and execute a corrective action on an account of a collaboration conferencing system in response to the comparison of the at least one predicted access code to the database of valid access codes, wherein the corrective action on the account prevents access to the collaboration conferencing system from the communication device.

Another implementation of the present disclosure may take the form of a method for operating a collaboration conference. The method includes the operations of receiving a plurality of incorrect access codes from a communication device connected to a telecommunications network hosting the collaboration conference, conducting pattern recognition on the plurality of incorrect access codes to predict at least one predicted access code from the communication device, and comparing the at least one predicted access code to a database of valid access codes. Further, the method includes executing a corrective action on an account of a collaboration conferencing system in response to the comparison of the at least one predicted access code to the database of valid access codes, wherein the corrective action on the account prevents access to the collaboration conferencing system from the communication device.

DETAILED DESCRIPTION

Aspects of the present disclosure involve systems, methods, computer program products, and the like, for collaboration conferencing with multiple participants over a communications network, and more specifically for detecting and preventing fraudulent access to one or more of the conferencing systems or accounts. The term "collaboration conferencing" as used herein includes any type of multimedia conferencing over a network, such as audio conferencing, web or internet conferencing and multi-site video conferencing. In one implementation, the network is a telecommunications network over which several communication devices or users may communicate or collaborate.

In addition, aspects of the present disclosure involve systems, methods, computer program products, and the like, for detecting a potentially fraudulent access of a collaboration conferencing system on a telecommunications network and executing a corrective action in response to the detected access attempt. In some instances, the corrective action includes denying access to the collaboration system when the fraudulent access attempt occurs. In other instances, the corrective action includes providing a warning to the caller, rerouting the communication to another system within the network, or reporting and storing of the fraudulent attempt. In general, to detect the possible fraudulent access attempt, a telecommunications system or other computing device may detect more than one fraudulent access attempts to the collaboration conferencing system and determine a pattern within the fraudulent attempts. With the pattern of attempts known, the system accesses a database to determine if a valid account is likely to be accessed by the fraudulent attempts and takes one or more actions to prevent access to the valid account. In this manner, the operations and systems described herein aid a telecommunications network in detecting and preventing fraudulent access to one or more accounts of the collaboration conferencing system.

Figure 1:
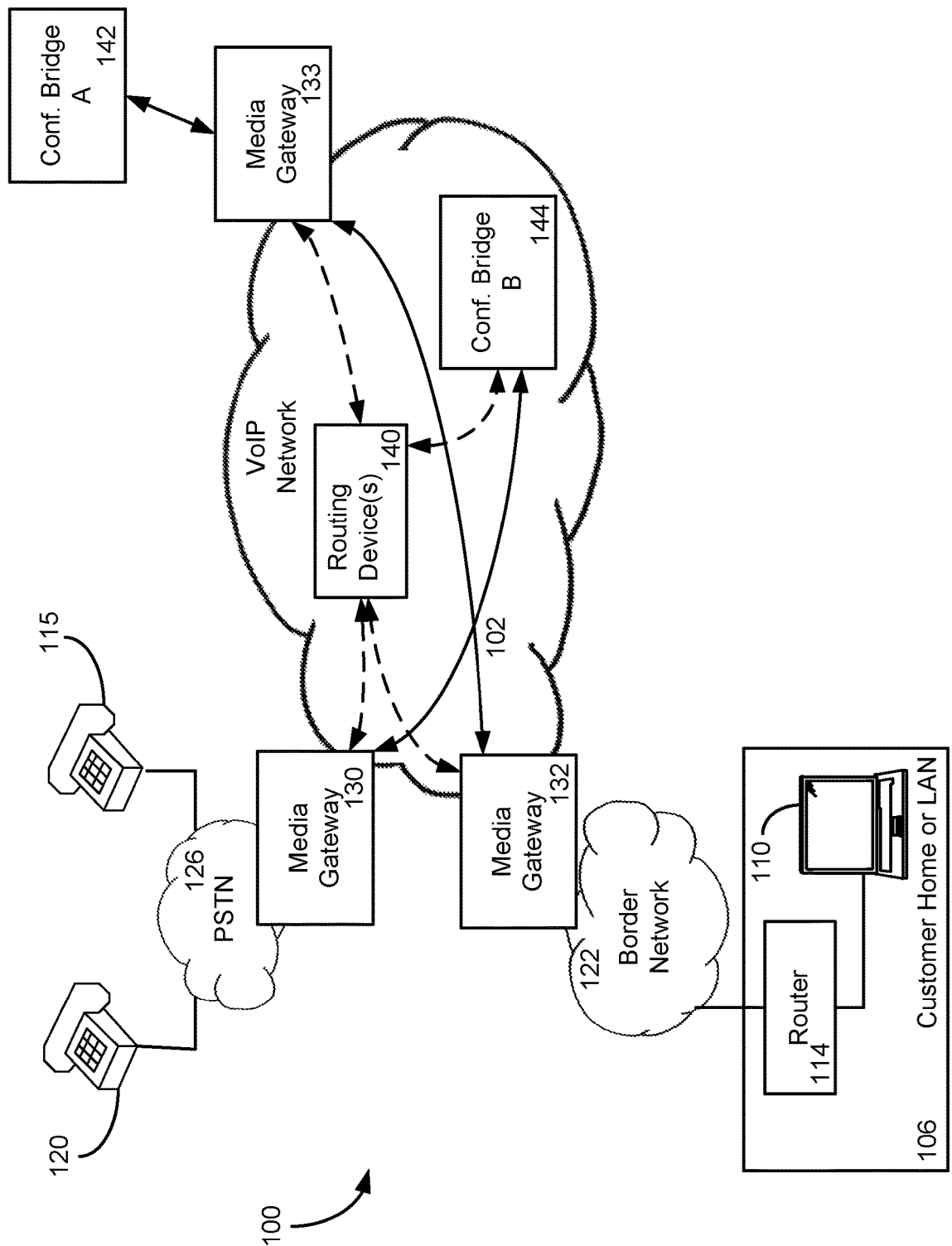
FIG. 1 schematic diagram illustrating an exemplary Voice over Internet Protocol (VoIP) operating environment, including a central conferencing routing server, in accordance with one embodiment.

FIG. 1 illustrates an exemplary operating environment 100 for hosting conference collaboration communications between multiple participants. The environment 100 provides for establishing communication sessions between network users. With specific reference to FIG. 1, the environment 100 includes a VoIP network 102, which may be provided by a wholesale network service provider. However, while the environment 100 of FIG. 1 shows a configuration using the VoIP network 102, it should be appreciated that portions of the network 102 may include non IP-based routing. For example, network 102 may include devices utilizing time division multiplexing (TDM) or plain old telephone service (POTS) switching. In general, the network 102 of FIG. 1 may include any communication network devices known or hereafter developed.

The VoIP network 102 includes numerous components such as, but not limited to gateways, routers, and registrars, which enable communication across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a participant in a conference will connect with the system for the conference.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home- or business-based, but they can be relocated and may be designed for easy portability. For example, the communication device 110 may be wireless (e.g., cellular) telephone, smart phone, tablet or portable laptop computer.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

In general, a request for a collaboration conference over the VoIP network 102 is initiated by a requester through one of the communication devices 110, 115, 120 associated with the network. As used herein, the term "collaboration conference" includes any type of collaboration between three or more users of a communication network. For example, the collaboration conference may include audio collaboration, video collaboration, web collaboration, a combination of any of the above, and the like. For ease of instruction, the collaboration conferences discussed herein are generally made in reference to an audio conference, although any type of collaboration conference over a telecommunications network is envisioned with respect to the present disclosure. Similarly, although FIG. 1 illustrates some of the communication devices 115, 120 as telephonic devices, the communication devices may be any type of communication device, including personal computers, cellular phones and the like.

Upon receipt of the request for a collaboration conference, the network 102 routes the request to a routing device 140 or routing devices integrated within the network 102. However, it should be appreciated that the routing device 140 may be a part of the network 102, may be separate from the network, or may have portions deployed in the network and out of the network. In addition, the routing device 140 may be resident on one or more components of the VoIP network 140, including several instances of the routing device 140 integrated throughout the network 140. Further, although only a single instance of a routing device 140 is illustrated in FIG. 1, any number of routing devices may be present in the network 102. In one particular embodiment, the routing device 140 is referred to as a Collaboration Conferencing Routing Server (CCRS).

To transmit the request to the network, the requester uses the communication device 110, 115, 120 to enter a conference specific telephone number or access port. The routing device 140 receives the request to begin a collaboration conference or join an existing conference. In response, and described in more detail below, the routing device 140 may route the one or more requests to one of several conference bridges 142, 144 associated with the VoIP network 102 for hosting of the collaboration conference. Although only two conference bridges 142, 144 are shown in FIG. 1, it should be appreciated that any number of conference bridges may be associated with the network 102 for hosting collaboration conferences.

In general, the conference bridges 142, 144 provide a hosting site for a collaboration conference between a plurality of users of the network 102. Thus, conference bridge A 142 may host a collaboration conference while conference bridge B 144 may host an additional collaboration conference. In particular, conference bridge A 142 is connected to the communications network 102 through a media gateway 133 similar to the media gateway disclosed above. This configuration may be utilized when the conference bridge 142 is a time division multiplex (TDM) bridge. Conference bridge B 144 is internal to the VoIP network 102 through which the communications of the conference are transmitted. This configuration is utilized for Internet Protocol (IP) based bridges and is generally described in more detail below.

One particular network and/or conference bridge platform supported by the network configuration 102 of FIG. 1 is a Session Initiation Protocol (SIP) based network. For example, conference bridge B 144 may be a SIP-based conference bridge. Such IP-based components may provide additional conferencing features to the network by providing information concerning the collaboration conference in a header of a message transmitted through the network such as an identification of the collaboration conference, video integration, Uniform Resource Identifier (URI) based routing and conference integration, conference access credentials for authentication and permission to enter the requested conference. SIP-based conference bridges may also provide high definition audio, additional security features and transitions between collaboration conferences without having to redial into the system. In general, because components operating utilizing SIP can exchange information within a header, many additional features for a collaboration conference can be offered to participants on a SIP-based conference bridge. In addition, SIP-based CCRS devices may utilize many of the advantages of information exchange within the header when communicating with TDM-based network devices.

To connect to a collaboration conference, each participant to the conference may be routed to the same conference bridge 144 for the duration of the conference. The conference bridge 144, in turn, provides communication ports for each participant such that each participant can hear or otherwise participate in the collaboration conference. Any conference bridge known in the art or hereafter developed may be integrated into the system 100 of FIG. 1 for hosting a collaboration conference, including IP-based conference bridges. In addition, the term "conference bridge" or "bridge" includes any component of a communication network that provides an access point to one or more users of the network for a collaboration conference. For example, "conference bridge" may also include such devices as a media server device, a gateway server device or the like as configured within the network 102.

In some instances, the conference bridge 144 or routing device 140, upon receipt of the request to initiate or join a collaboration conference, executes an application that queries the requester to enter an access code number that the requester enters into the communication device 110, 115, 120. With this information, the network 102 determines that the requester intends to initiate or join a collaboration conference and routes the request to a conference bridge, as explained in greater detail below. Thus, each participant to the collaboration conference may provide the same access code to the routing device 140 to be routed to the same bridge to attend the collaboration conference. Further, in some networks, the conferencing bridge 142, 144 may request additional information from a chairperson of the collaboration conference to identify the participant as the chairperson. In a similar manner as described above, the chairperson may provide the information to the bridge 142, 144 through the communication device 110, 115, 120 to identify the participant as the chairperson. The chairperson of the collaboration conference is generally given access to additional features of the collaboration conference.

As explained above, non-subscribers to a collaboration conferencing system may attempt to obtain or guess valid access codes to the collaboration system to access the system for fraudulent uses. In one particular approach, illegitimate users dial into the collaboration conferencing system and provide several estimated access codes to determine if any of the access codes grant access to the system. This attempting to guess a valid access code to utilize a subscriber's subscription to the collaboration conferencing system many inefficiencies within the operation of the telecommunications network and, in particular, the collaboration conferencing system hosted by the network.

In one embodiment of the present disclosure, the collaboration conferencing system may execute an escalating lockout period to attempt to prevent the unauthorized access of the system. In particular, the routing device 140 may detect an incorrect access code from a particular automatic number identification (ANI) feature of the system. In general, many telecommunications networks automatically determine an origination telephone number on communications made to the network, known as the ANI of the originating device. Thus, the routing device 140 of the system detects a wrong access code provided by a device associated with a particular ANI. Upon the receipt of an incorrect access code, the routing device 140 requests for the participant to re-enter the access code to authenticate the participant's identification or use of the system. The routing device 140 may then track the number of subsequent incorrect access codes provided from that particular ANI device. The tracking of incorrect access codes may be executed by the routing device 140 for access codes and/or the conferencing bridge for chairperson identification.

In some instances, the routing device 140 or conferencing bridge 142, 144 may be configured to allow a particular number of incorrect access codes received from an ANI associated with a communication device within a time frame. If the number of incorrect access codes or chairperson codes received at the routing device 140 or the conferencing bridge 142, 144 exceeds a threshold value, the routing device may deny any inputs received from that ANI for a time window. For example, after receiving three incorrect access codes or chairperson codes from a particular ANI within a five minute window, the routing device 140 may deny any additional access codes from the ANI for a period of two minutes. In general, however, the threshold number, the time window for receiving the incorrect codes, and the length of the disable window may be any value as determined by the collaboration conferencing system. In addition, the routing device 140 or conferencing bridge 142, 144 may increase the length of the disable window as more incorrect codes are received from the ANI and, in some instances, may disable all access codes received from the ANI until a user associated with the ANI personally communicates with an administrator of the telecommunications network.

Figure 2A:
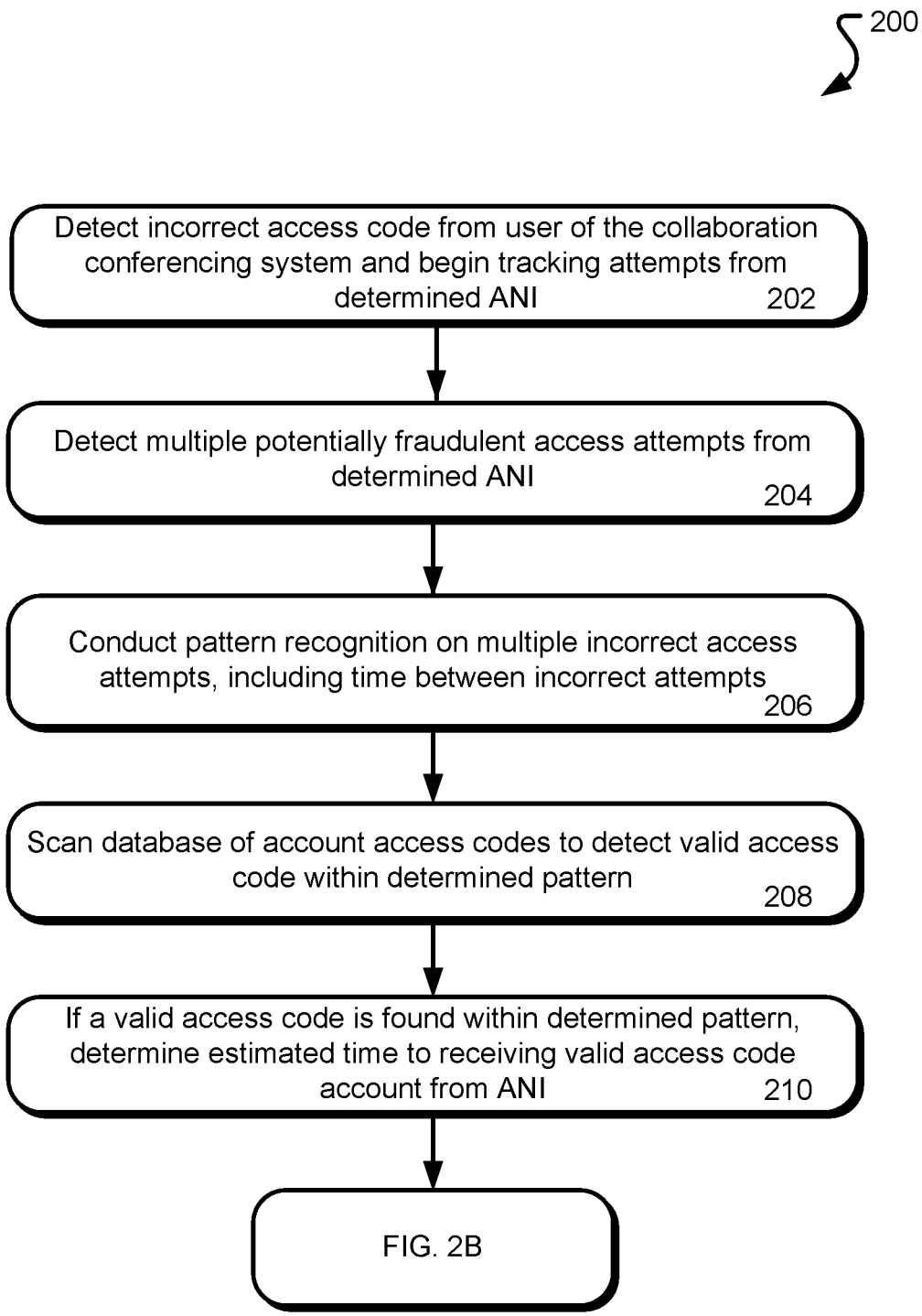
FIGS. 2A and 2B illustrate a flowchart of a method for predicting a fraudulent access to a valid account of a collaboration conferencing system of a telecommunications network.
Figure 2B:
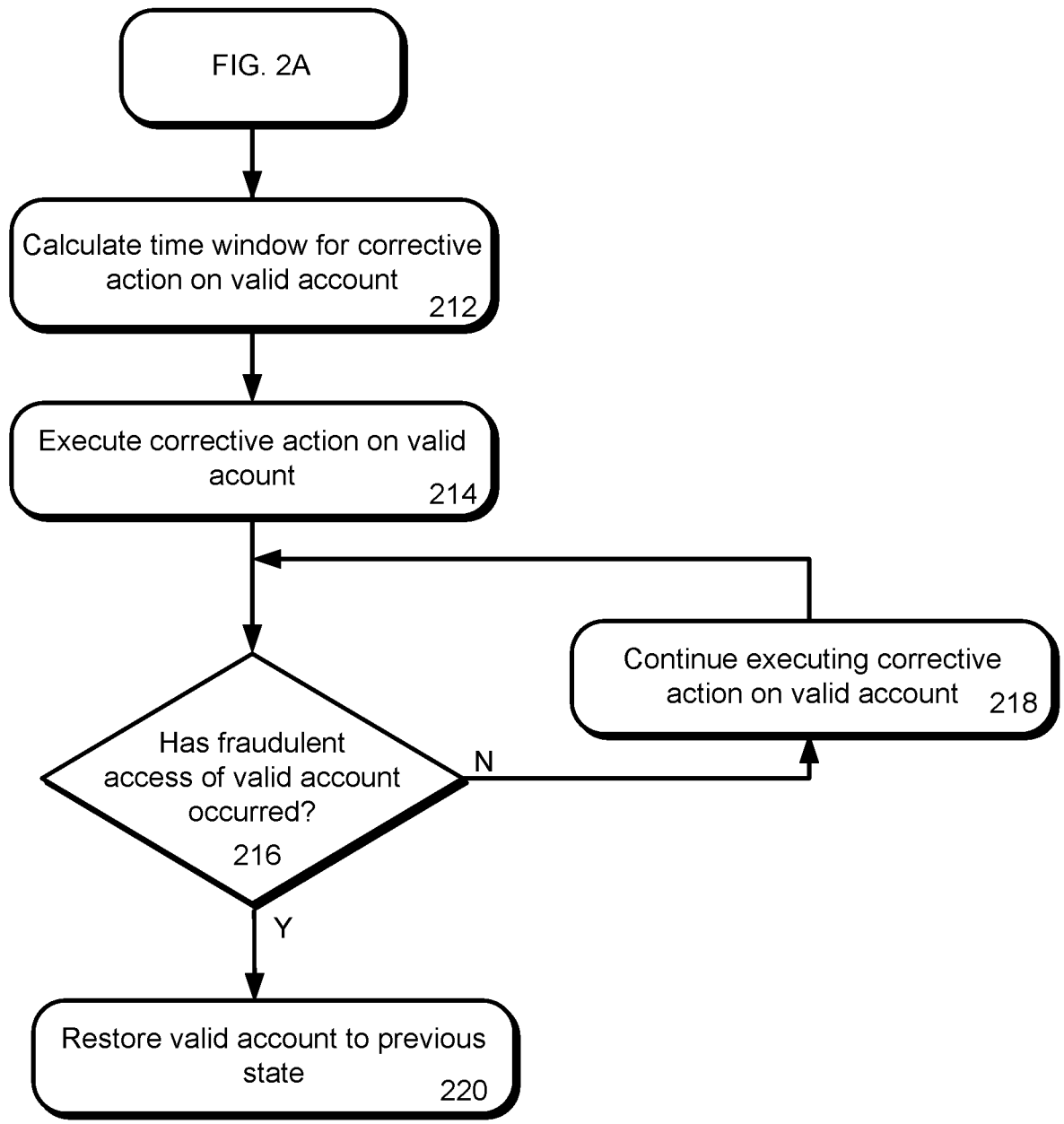

Alternatively or in addition, the routing device 140 or conferencing bridge 142, 144 may also be configured to predict or estimate a future access code that corresponds to a valid account and prevent access to the valid account. For example, FIGS. 2A and 2B is a flowchart of a method 200 for predicting a fraudulent access to a valid account of a collaboration conferencing system of a telecommunications network and to take remedial or preventative actions to prevent the access of the valid account by the fraudulent user. In general, the operations of the method 200 may be performed by the routing device 140 and/or the conferencing bridge 142, 144 of the collaboration conferencing system. Such operations may be performed through one or more software instruction executed by a processing device, through a configuration of a hardware circuit, or through a combination of both software and hardware components. Through the method 200, the collaboration conferencing system determines a pattern of incorrect access code received from a particular ANI of the network, predicts that the pattern will yield a correct access code to a valid account at some time in the future, and takes remedial or preventative actions on the valid account to prevent access to the account from the guessing ANI. Thus, the fraudulent user may not only be denied access to the valid account, but may also be denied the knowledge that the access code is a valid access code to the system for other fraudulent users to gain access to utilize.

Although discussed throughout as being executed by the routing device 240, it should be appreciated that any component of the telecommunications network 100 may perform one or more of the operations described. For example, the conferencing bridge 142, 144 may also perform the operations described in relation to receiving incorrect chairperson codes. Also, the routing device 240 may include several components (such as several application servers) such that any one of the components may execute the operations. Communication between the components through the network 102 may also occur to aid the components of the routing device 140 in executing the operations of the described method 200.

Beginning in operation 202, the routing device 240 receives or otherwise detects an incorrect access code provided to the system. Often times, these incorrect access codes are simple mistakes from a valid user attempting the access the collaboration conferencing system. However, in some instances, the received incorrect access code is an attempt from an unauthorized user to access a legitimate collaboration account by guessing the account's access code. Thus, also in operation 202, the routing device 140 may begin tracking incorrect access codes received from the ANI. In circumstances where the incorrect access code is received from a valid user, a correct access code is typically received within the next few attempts. The routing device 140 may then determine that the incorrect access code was received from a valid user and discontinue tracking attempts from the ANI.

Figure 3:
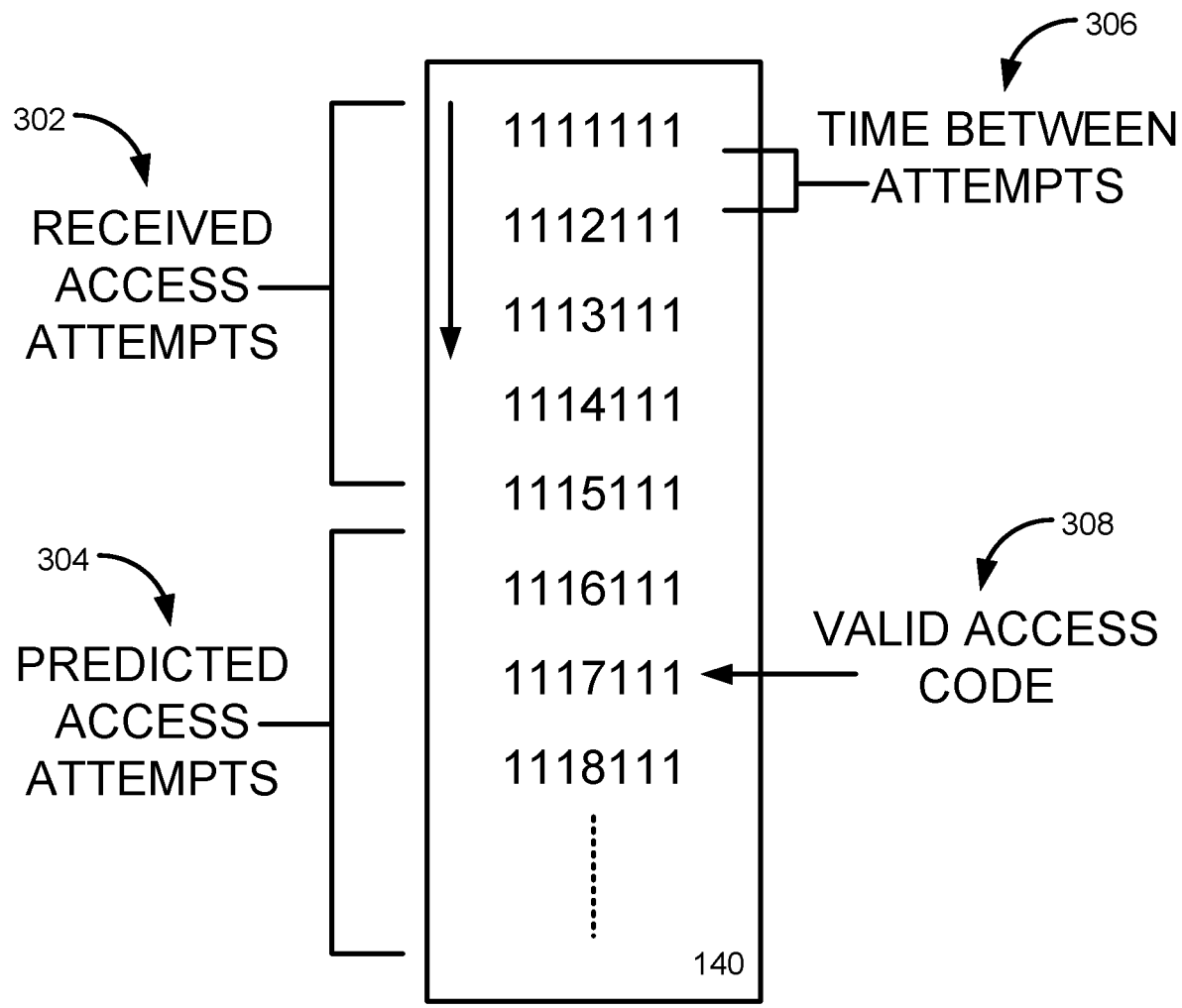
FIG. 3 is a diagram illustrating receiving attempted access to a collaboration conferencing system and predicting a fraudulent access to the system.

Often, a fraudulent user to the system will provide many incorrect access codes to the collaboration conferencing system to guess at a valid access code. Thus, for potentially fraudulent users, the routing device 140 detects multiple incorrect access codes from a particular ANI received at the system in operation 204. Further, these multiple guesses are often provided in a pattern. For example, the access code for the collaboration conferencing system may be a string of seven numbers XXXXXXX. During the brunt force attempt to access the collaboration conference, the fraudulent user will often increment or change one digit of the string at a time. In particular, FIG. 3 is a diagram illustrating a routing device 140 receiving attempted access to a collaboration conferencing system and predicting a fraudulent access to the system. As shown in FIG. 3, a user of the collaboration conferencing system may enter a first access code guess ("1111111"), followed by other guesses that increment one digit ("1112111", "1113111", "1114111", "1115111", etc.), illustrated as received access attempts 302. In other example, the user may decrement a digit of the string, may increment a first number in the string followed by incrementing a second number in the string, may increment a digit in the string by two or three, and the like. Regardless of the particular approach utilized by the unauthorized user, the multiple attempts 302 by the user often follow a pattern of some kind.

Because the routing device 140 is tracking the received access codes from the particular ANI, the routing device may conduct a pattern recognition on the multiple incorrect access codes from the ANI to obtain the pattern utilized by the unauthorized user in operation 206. In one particular implementation, a regular expression pattern recognition algorithm is applied to the stored incorrect access codes received from the ANI to detect a pattern in the codes. In another implementation, a modulus operation is applied to the noted incorrect access codes. In general, a modulus devices finds a remainder after dividing one number from another. The modulus operation may indicate that a particular digit within the received access codes is changing while the rest of the digits remain the same from one attempt to the next. In general, any pattern recognition algorithm may be applied by the routing device 140 to determine a pattern to the access codes provided by the unauthorized user to the collaboration conferencing system.

Also in operation 206, the routing device 140 may determine an estimated or average time 306 between receiving incorrect access codes from the potential unauthorized user. Although the time between receiving each incorrect access code may vary, the routing device 140 may calculate an average time between access codes. Thus, the time 306 between receiving a first access code and a second access code may be 30 seconds, while the time between a second access code and a third access code may be 25 seconds. The routing device 140 may maintain this information to estimate when other access codes in the pattern will be received. The routing device 140 may also note or determine increases or decreases in the time between received access codes for use in calculating the estimated time between access codes in the pattern.

Once the pattern (including time) of the received access codes is determined, the routing device 140 may predict 304 which access codes will be received by the unauthorized user in the future. Continuing the example above of FIG. 3, if the routing device 140 receives incorrect access codes from an ANI in the pattern "1111111", "1112111", "1113111", "1114111", "1115111", the routing device may predict 304 that the next access code to be received from the ANI will be "1116111", followed by "1117111", "1118111", and so on. In some instances, one or more of the predicted access codes may correspond with a valid access code, such as valid access code 1117111 (308) of FIG. 3. Thus, in operation 208, the routing device 140 may scan a database of valid access codes and compare those access codes to the predicted access codes 304 from the unauthorized user based on the detected pattern. In one embodiment, the routing device 140 may limit the number of predicted access codes 304 to a particular number such that the comparison with valid access codes in the database can be achieved with minimal processing consumption of the routing device. However, the routing device may predict any number of potential access codes and compare those predicted access codes to valid codes stored in the database.

If a valid access code 308 is found in the database that matches a predicted access code from the unauthorized user, the routing device may determine an estimated time to receiving the valid access code from the ANI in operation 210. For example, the routing device 140 utilizes the estimated time between receiving incorrect access codes determined above and the number of predicted access codes until the unauthorized user is predicted to reach the valid code to estimate the time until the valid code is provided by the unauthorized user. In one embodiment, however, the routing device 140 may dismiss or skip this operation and not predict an estimated time to receiving the valid access code.

Once it is determined that the unauthorized user of the collaboration conferencing system is predicted to enter or provide a valid access code, the system may take any number of remedial or preventative efforts to prevent the unauthorized user from accessing the system. In one example, the routing device 140 may suspend the account associated with the predicted valid access code such that access to the account is not available through the collaboration conferencing system. The suspension of the account may occur for a limited time as determined by the routing device 140. The suspension period may occur for long enough to prevent the unauthorized user from accessing the account, but may be configured to minimize any negative effects experienced by the authorized user of the valid account. The calculation of the time window of the suspension of the account in the collaboration conferencing system is described in more detail below. In general, the suspension of the account includes disabling the valid access code to access the account from the valid access code database and storing the access code in memory of in a temporary database for future re-enablement. Thus, when the unauthorized user provides the removed access code the collaboration conferencing system, the user is unable to access the valid account in the database and provides an error message or indication to the unauthorized user. Presumably, the unauthorized user continues to provide incorrect access codes to the collaboration conferencing system unaware that a valid code was removed from the database. After the time window for the corrective action expires or the system receives the attempt from the identified unauthorized user, the collaboration conferencing system returns the valid access code to the database for future use by the authorized user of the account.

In addition or alternatively, other corrective actions may also be performed by components of the collaboration conferencing system, such as the routing device 140. For example, the routing device 140 may alter the parameters of the account of the predicted valid access code to play a message to the user's communication device upon receiving the access code. The message may indicate that an unauthorized access of the account is detected and to instruct the unauthorized user to cease attempting to access the system.

In another example, the routing device 140 may route the user to a network or device associated with an authority to report the unauthorized access of the system. Such routing may provide the unauthorized user's ANI or other identifying information to the authority network. In still another example, the corrective action may include connecting the unauthorized user to a conferencing bridge but not allowing other participants to access the same conferencing bridge to collaborate. In general, any action of the routing device 140 in response to predicting a correct access code from the unauthorized user is contemplated and may be executed by the routing device. The application of the corrective action to the account associated with the valid access code is described below with reference to FIG. 2B.

As shown in FIG. 2B, the routing device 140 may calculate a time window in which to undertake a corrective action on the valid account in response to the predicted correct access code in operation 212. The calculated time window for the corrective action may consider many factors. For example, the routing device 140 may utilize the estimated time between receiving incorrect access codes from the particular ANI and the number of predicted failed attempts before the predicted correct attempt to determine a time to receiving a valid access code. With this information, the routing device 140 may create the time window to suspend the valid account before receiving the correct access code and restore the valid account after receiving the correct access code. The routing device 140 may also provide extra time on either side of the time window to account for the estimated values. In general, the routing device 140 may weigh the concerns of preventing access to the collaboration conferencing system for the unauthorized user to any inconveniences experienced by the valid user of the account. Such concerns may also be based on time or day, week, or year. For example, the time window may be increased if occurring on the weekend or overnight as access to the account by the valid user may be less likely at those times. Other considerations may include variations on the time between receiving incorrect access codes from the ANI and the likelihood of repeated attempts on the same incorrect access code. In another embodiment, the time window may begin immediately upon the prediction of a valid access code from the unauthorized user. In general, the calculated time window may be for any length of time as determined by the routing device 140. Further, in some instances, the corrective action may be limited to only the ANI of the identified fraud user.

In operation 214, the routing device 140 executes the corrective action on the valid account. Further, in operation 216, the routing device 140 may determine if the attempted fraudulent access of the valid account has occurred by detecting when the access code of the valid account is received from the particular ANI. If the predicted access code has not been received, the routing device 140 continues to execute the corrective action in operation 218 and returns to operation 216. However, after the fraudulent access attempt is detected, the routing device 140 may restore the account to its valid state in operation 220. In this manner, the routing device 140 may monitor the received access codes from the unauthorized user to determine when the account may be restored. In other embodiments, the account is restored upon the expiring of the time window, with or without the detected fraudulent access to the account. In those circumstances where the time window expires without the fraudulent attempt from the unauthorized user being detected, the routing device 140 may re-execute the corrective action and start a new time window.

Regardless of how the routing device 140 determines when to restore the valid account to its previous state, the operations of the method 200 provide a proactive response to a potentially fraudulent access of the collaboration conferencing system. If the corrective action includes suspension of the valid account before the unauthorized user provides the access code for the account, the unauthorized user does not obtain the knowledge that the access code is a valid code. This may operate to not only deny access to the conferencing system by the unauthorized user, but may prevent access for other unauthorized users. As such, the operations provided herein are a more proactive approach to unauthorized users attempting to access the collaboration conferencing system than previously known or developed responses.

Figure 4:
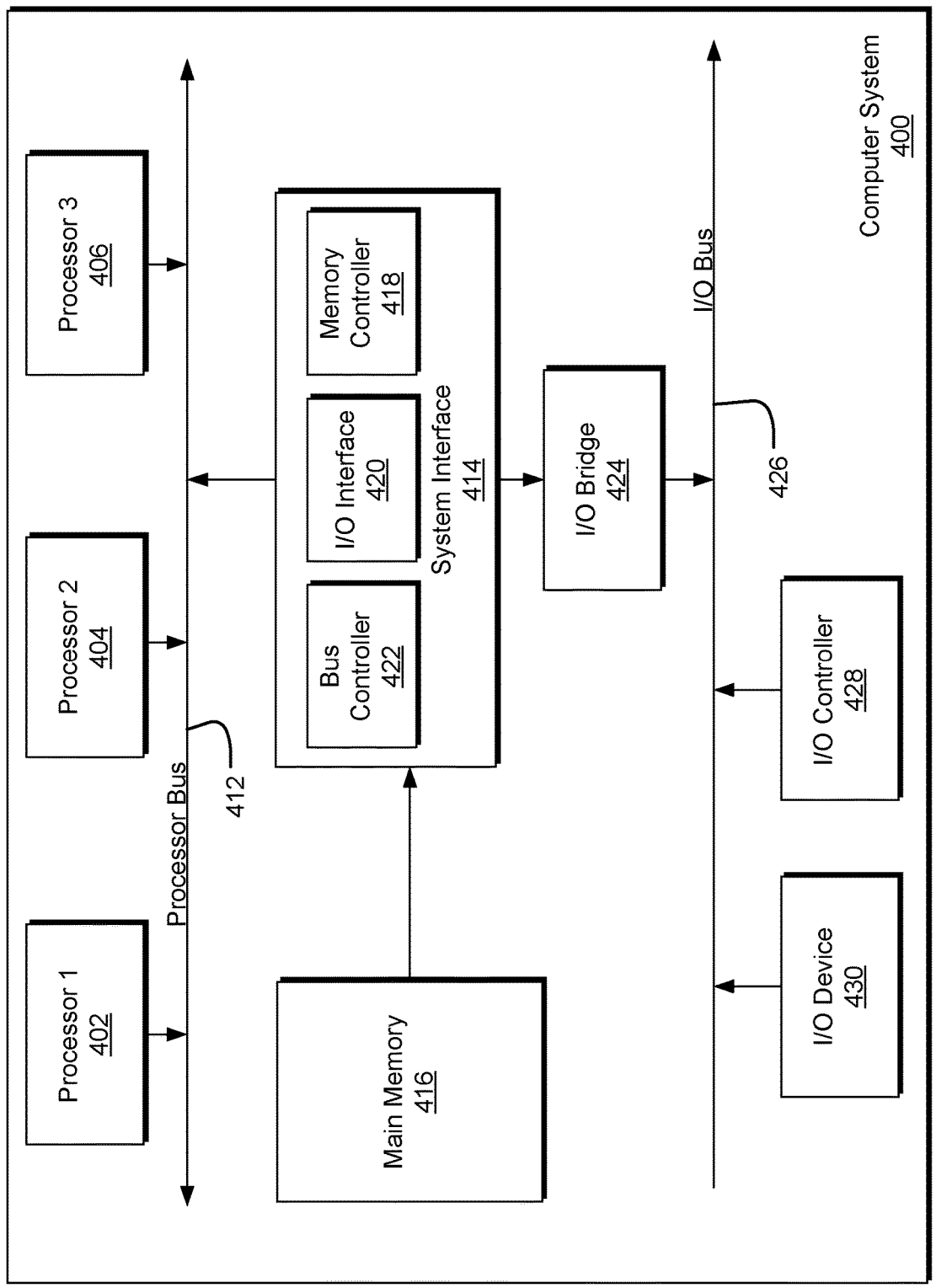
FIG. 4 is a diagram illustrating an example of a computing system which may be used in implementing embodiments of the present disclosure.

FIG. 4 is a block diagram illustrating an example of a computing device or computer system 400 which may be used in implementing embodiments of the present invention. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. Processors 402-406 may also be purpose built for processing/mixing media data, such as audio or video components of a media stream, such as a digital switch processor. System interface 414 may be connected to the processor bus 412 to interface other components of the system 400 with the processor bus 412. For example, system interface 414 may include a memory controller 416 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A telecommunications system comprising:
  at least one conference bridge; and
  at least one routing device configured to:
    receive a plurality of incorrect access codes from a communication device connected to the telecommunications network;
    generate a set of predicted access codes using pattern recognition, wherein the set of predicted access codes is based on the plurality of incorrect access codes;
    compare the generated set of predicted access codes to a database of valid access codes; and
    when at least one predicted access code of the set of predicted access codes is in the database of valid access codes, execute a corrective action on an account of a collaboration conferencing system, wherein the corrective action on the account prevents access to the collaboration conferencing system from the communication device using the at least one predicted access code.

2. The telecommunications system of claim 1 wherein the at least one routing device is further configured to correlate the communication device connected to the telecommunications network to an automatic number identification (ANI) associated with the communication device.

3. The telecommunications system of claim 1 wherein a first incorrect access code of the plurality of incorrect access codes comprises at least one incrementing digit from a previously received incorrect access code of the plurality of incorrect access codes.

4. The telecommunications system of claim 1 wherein a first incorrect access code of the plurality of incorrect access codes comprises at least one decrementing digit from a previously received incorrect access code of the plurality of incorrect access codes.

5. The telecommunications system of claim 1 wherein the at least one routing device is further configured to calculate an estimated time to receiving the at least one predicted access code from the communication device.

6. The telecommunications system of claim 5 wherein the at least one routing device is further configured to measure a time between receiving at least two consecutive incorrect access codes from the plurality of incorrect access codes received from the communication device.

7. The telecommunications system of claim 6 wherein the estimated time to receiving the at least one predicted access code from the communication device is based at least on the measure of the time between receiving the at least two consecutive incorrect access codes from the plurality of incorrect access codes.

8. The telecommunications system of claim 7 wherein the corrective action comprises suspending the account of a collaboration conferencing system to prevent access to the collaboration conferencing system from the communication device.

9. The telecommunications system of claim 8 wherein the suspension of the account of the collaboration conferencing system is executed for at least the estimated time to receiving the at least one predicted access code from the communication device.

10. The telecommunications system of claim 7 wherein the at least one routing device is further configured to receive the at least one predicted access code from the communication device and the suspension of the account of the collaboration conferencing system is executed until the at least one predicted access code is received at the at least one routing device.

11. A method for operating a collaboration conference, the method comprising:
receiving a plurality of incorrect access codes from a communication device connected to a telecommunications network hosting the collaboration conference;
generating a set of predicted access codes based on the plurality of incorrect access codes using pattern recognition;
comparing the generated set of predicted access codes to a database of valid access codes; and
executing a corrective action on an account of a collaboration conferencing system in response to the comparison of the generated set of predicted access codes to the database of valid access codes, wherein the corrective action on the account prevents access to the collaboration conferencing system from the communication device.

12. The method of claim 11 further comprising:
correlating the communication device connected to the telecommunications network to an automatic number identification (ANI) associated with the communication device.

13. The method of claim 11 wherein a first incorrect access code of the plurality of incorrect access codes comprises at least one incrementing digit from a previously received incorrect access code of the plurality of incorrect access codes.

14. The method of claim 11 wherein a first incorrect access code of the plurality of incorrect access codes comprises at least one decrementing digit from a previously received incorrect access code of the plurality of incorrect access codes.

15. The method of claim 11 further comprising:
calculating an estimated time to receiving at least one predicted access code of the generated set of predicted access codes from the communication device.

16. The method of claim 15 further comprising:
measuring a time between receiving at least two consecutive incorrect access codes from the plurality of incorrect access codes received from the communication device.

17. The method of claim 16 wherein the estimated time to receiving the at least one predicted access code from the communication device is based at least on the measure of the time between receiving the at least two consecutive incorrect access codes from the plurality of incorrect access codes.

18. The method of claim 17 wherein the corrective action comprises suspending the account of a collaboration conferencing system in response to the comparison of the generated set of predicted access codes to the database of valid access codes to prevent access to the collaboration conferencing system from the communication device.

19. The method of claim 18 wherein the suspension of the account of the collaboration conferencing system is executed for at least the estimated time to receiving the at least one predicted access code from the communication device.

20. The method of claim 17 further comprising:
receiving the at least one predicted access code from the communication device and the suspension of the account of the collaboration conferencing system is executed until the at least one predicted access code is received at the at least one routing device.

* * * * *